United States Patent
Kaneko et al.

(10) Patent No.: US 9,685,829 B2
(45) Date of Patent: Jun. 20, 2017

(54) PERMANENT MAGNET-TYPE ROTARY ELECTRIC MACHINE AND VEHICLE DRIVE SYSTEM

(75) Inventors: Kenta Kaneko, Tokyo (JP); Moriyuki Hazeyama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 197 days.

(21) Appl. No.: 14/390,048

(22) PCT Filed: Apr. 23, 2012

(86) PCT No.: PCT/JP2012/060858
§ 371 (c)(1),
(2), (4) Date: Oct. 2, 2014

(87) PCT Pub. No.: WO2013/160988
PCT Pub. Date: Oct. 31, 2013

(65) Prior Publication Data
US 2015/0077034 A1 Mar. 19, 2015

(51) Int. Cl.
*H02K 3/46* (2006.01)
*H02K 7/08* (2006.01)
(Continued)

(52) U.S. Cl.
CPC .................. *H02K 1/32* (2013.01); *B60L 1/02* (2013.01); *B60L 3/003* (2013.01); *B60L 3/0061* (2013.01);
(Continued)

(58) Field of Classification Search
CPC ........... H02K 7/108; H02K 3/28; H02K 11/30
See application file for complete search history.

(56) References Cited

U.S. PATENT DOCUMENTS 3,801,843 A    4/1974  Corman et al.
7,911,091 B2 *  3/2011  Takenaka ............. H02K 1/2766
                                                    310/156.57
(Continued)

FOREIGN PATENT DOCUMENTS

EP    1306903 A1    5/2003
JP    11-285288 A   10/1999
(Continued)

OTHER PUBLICATIONS

International Search Report (PCT/ISA/210) mailed on Jul. 10, 2012, by the Japanese Patent Office as the International Searching Authority for International Application No. PCT/JP2012/060858.
(Continued)

*Primary Examiner* — Eduardo Colon Santana
*Assistant Examiner* — Charles S Laughlin
(74) *Attorney, Agent, or Firm* — Buchanan Ingersoll & Rooney PC (57) ABSTRACT

A rotor core includes magnet insertion holes embedding permanent magnets and arranged in a substantially U-shape, facing an outer circumferential surface of a rotor, and includes hollow portions formed at both side surface portions in a direction orthogonal to a magnetization direction of the permanent magnets embedded in the magnet insertion holes. A permanent magnet group for each pole having the plurality of permanent magnets includes vent holes passing through the rotor core in a direction of a rotating shaft, between one of the magnet insertion holes in which the permanent magnets are embedded and adjacent one of the magnet insertion holes or between the one of the magnet insertion holes and outer circumferential portions of the rotor core. The vent holes are arranged at positions to form the substantially U-shape together with the magnet insertion holes.

10 Claims, 7 Drawing Sheets

(51) Int. Cl.
*H02K 11/21* (2016.01)
*H02K 1/32* (2006.01)
*H02K 1/27* (2006.01)
*H02K 9/10* (2006.01)
*B60L 1/02* (2006.01)
*B60L 3/00* (2006.01)
*B60L 7/14* (2006.01)
*B60L 7/26* (2006.01)
*B60L 9/22* (2006.01)
*B60L 15/00* (2006.01)
*B60L 15/20* (2006.01)

(52) U.S. Cl.
CPC ...... *B60L 7/14* (2013.01); *B60L 7/26* (2013.01); *B60L 9/22* (2013.01); *B60L 15/007* (2013.01); *B60L 15/20* (2013.01); *H02K 1/274* (2013.01); *H02K 1/2766* (2013.01); *H02K 9/10* (2013.01); *B60L 2200/26* (2013.01); *B60L 2220/14* (2013.01); *B60L 2220/50* (2013.01); *B60L 2240/36* (2013.01); *B60L 2240/421* (2013.01); *B60L 2240/423* (2013.01); *B60L 2240/427* (2013.01); *B60L 2240/429* (2013.01); *H02K 2213/03* (2013.01); *Y02T 10/641* (2013.01); *Y02T 10/645* (2013.01); *Y02T 10/72* (2013.01); *Y02T 10/7275* (2013.01)

(56) References Cited

U.S. PATENT DOCUMENTS

| 8,912,738 | B2 | 12/2014 | Mahlein et al. | |
|---|---|---|---|---|
| 2003/0011265 | A1* | 1/2003 | Hattori | H02K 1/2766 310/156.38 |
| 2003/0222526 | A1* | 12/2003 | Matsunobu | H02K 1/276 310/156.45 |
| 2007/0284961 | A1* | 12/2007 | Takahashi | H02K 1/276 310/156.78 |
| 2010/0014325 | A1* | 1/2010 | Raju | H02M 5/458 363/37 |
| 2010/0133941 | A1* | 6/2010 | Feng | H02K 1/223 310/156.83 |
| 2011/0278967 | A1 | 11/2011 | Utaka | |
| 2012/0091848 | A1* | 4/2012 | Sakai | H02K 1/2766 310/156.43 |
| 2012/0139378 | A1* | 6/2012 | Endo | H02K 1/2766 310/156.21 |

FOREIGN PATENT DOCUMENTS

| JP | 2002-209349 A | | 7/2002 | |
|---|---|---|---|---|
| JP | 2006-311770 A | | 11/2006 | |
| JP | 2008-79418 A | | 4/2008 | |
| JP | 2008079418 A | * | 4/2008 | ........... B60L 9/18 |
| JP | 2010-93906 A | | 4/2010 | |
| JP | 2010183659 A | | 8/2010 | |
| JP | WO 2011077513 A1 | * | 6/2011 | ........... H02K 1/2766 |
| JP | 2011-259691 A | | 12/2011 | |
| JP | 2012-55117 A | | 3/2012 | |
| WO | 2010108623 A1 | | 9/2010 | |
| WO | WO 2011/002043 A1 | | 1/2011 | |

OTHER PUBLICATIONS

Written Opinion (PCT/ISA/237) mailed on Jul. 10, 2012, by the Japanese Patent Office as the International Searching Authority for International Application No. PCT/JP2012/060858.
Notice of Rejection mailed Jan. 22, 2013, with English Translation of Office Action, 10 pages.
Decision of Final Rejection mailed May 21, 2013, with English Translation of Final Office Action, 5 pages.
Hahlbeck, Steffen at al. "Design Considerations for Rotors with Embedded V-Shape Permanent Magnets," 18th International Conference on Electrical Machines, 2008. Piscataway, NJ (Sep. 6, 2008), pp. 1-4.
Extended European Search Report issued by the European Patent Office on Jul. 5, 2016 in corresponding European Patent Application No. 12875182.3 (10 pages).
Second Office Action issued by the Chinese Patent Office on Dec. 23, 2016 in corresponding Chinese Application No. 2012800725518, Partial English Translation (12 pages).

* cited by examiner

PERMANENT MAGNET-TYPE ROTARY ELECTRIC MACHINE AND VEHICLE DRIVE SYSTEM

FIELD

The present invention relates to a rotary electric machine such as a vehicle motor, and more particularly to a configuration of a rotor in a permanent magnet-type rotary electric machine in which permanent magnets are arranged inside of the rotor.

BACKGROUND

One example of the rotary electric machine in which permanent magnets are arrange inside of the rotor is a motor (a permanent magnet-type motor) having permanent magnets incorporated therein. As compared to an induction motor widely used in various fields, the permanent magnet-type motor is known as a highly efficient motor because an excitation current is unnecessary due to magnetic fluxes established by the permanent magnets incorporated in the rotor and no secondary copper loss occurs because no current flows in a rotor conductor unlike the induction motor. While the induction motor is conventionally used in railroad vehicles, application of a permanent magnet-type synchronous motor has been recently examined to achieve an efficiency enhancement, downscaling and an output increase, and simplification of a cooling structure.

The permanent magnet-type motor is roughly classified into a motor having a surface magnet structure (an SPM motor (Surface Permanent Magnet Motor)) in which permanent magnets are attached to a surface of a rotor, and a motor having an embedded magnet structure (an IPM motor (Interior Permanent Magnet Motor)) in which permanent magnets are embedded inside of a rotor. However, because a vehicle motor rotates at several thousand revolutions per minute, strength of the permanent magnets against centrifugal force at the time of high-speed rotation needs to be ensured. Accordingly, it can be said that the vehicle motor is almost limited to the IPM motor.

Conventionally, in an inverter for driving a vehicle motor, switching elements formed of silicon (Si) used as a base (hereinafter, "Si elements") are generally used. Accordingly, a current (a motor current) flowing in the IPM motor needs to be reduced to enhance overall efficiency including the IPM motor and the inverter and an output voltage of the IPM motor needs to be increased to ensure a desired motor output. For example, in Patent Literature 1 mentioned below, a no-load induced voltage of an IPM motor is equal to or higher than an overhead wire voltage or overhead line voltage in the case of the maximum number of revolutions of the IPM motor.

Patent Literature 2 discloses a shape of an IPM motor in which magnets of a rotor are arranged in such a manner that two of the magnets for each pole form a V-shape and a heat transfer member for cooling is located at a central portion of each of the V-shapes.

CITATION LIST

Patent Literatures

Patent Literature 1: Japanese Patent Application Laid-open No. 2008-79418

Patent Literature 2: Japanese Patent Application Laid-open No. 2011-259691

SUMMARY

Technical Problem

As described above, in the conventional vehicle motor (the IPM motor), the no-load induced voltage is equal to or higher than the overhead line voltage. Therefore, for example, when the inverter fails while an induced voltage equal to or higher than the overhead line voltage is generated between terminals of the IPM motor, control on a current tending to flow from the IPM motor toward the overhead line is required, which increases the number of components and complicates the control. The no-load induced voltage can be set to be equal to or lower than the overhead line voltage, for example, by reducing the number of turns in a stator winding of the IPM motor or increasing the number of parallel circuits to the stator winding. However, in such a method, a resistance value or an inductance of the IMP motor is reduced, and a harmonic current is likely to be superimposed on a stator of the IPM motor. This causes another problem that an iron loss in the IPM motor is increased, which becomes a restriction on an enhancement in the overall efficiency including the IPM motor and driving circuits such as the inverter.

The heat transfer members arranged as disclosed in Patent Literature 2 mentioned above are located at positions blocking magnetic paths of reluctance torque and thus the reluctance torque is reduced.

The present invention has been achieved in view of the above problems, and an object of the present invention is to provide a permanent magnet-type rotary electric machine and a vehicle drive system that can suppress reduction of reluctance torque and enhance overall efficiency including driving circuits such as an inverter while reducing the quantity of permanent magnets.

Solution to Problem

The present invention is directed to a permanent magnet-type rotary electric machine that achieves the object. The rotary electric machine is driven by an inverter including switching elements formed of a wide band-gap semiconductor. The rotary electric machine includes a stator that houses a stator coil inside of slots, and a rotor that has a rotor core arranged to be rotatable with respect to the stator via a rotation gap and has a plurality of permanent magnets embedded for each pole inside of the rotor core. The rotor core includes magnet insertion holes arranged in a substantially U-shape facing an outer circumferential surface of the rotor, for embedding the permanent magnets, and includes hollow portions formed at both side surface portions in a direction orthogonal to a magnetization direction of the permanent magnets embedded in each of the magnet insertion holes. A permanent magnet group for each pole having the plurality of permanent magnets includes vent holes passing through the rotor core in an axial direction between one of the magnet insertion holes in which the permanent magnets are embedded and adjacent one of the magnet insertion holes or between the one of the magnet insertion holes and outer circumferential portions of the rotor core. The vent holes are arranged at positions to form the substantially U-shape together with the magnet insertion holes.

Advantageous Effects of Invention

According to the present invention, vent holes are arranged along magnetic paths and adjacent to magnets.

Therefore, the vent holes can cool permanent magnets without blocking the magnetic paths of reluctance torque. Furthermore, because a wide band-gap semiconductor is used for an inverter, overall efficiency including driving circuits such as the inverter can be enhanced.

DESCRIPTION OF EMBODIMENTS

Exemplary embodiments of a permanent magnet-type rotary electric machine and a vehicle drive system according to the present invention will be explained below in detail with reference to the accompanying drawings. The present invention is not limited to the embodiments.

First Embodiment

Figure 1:
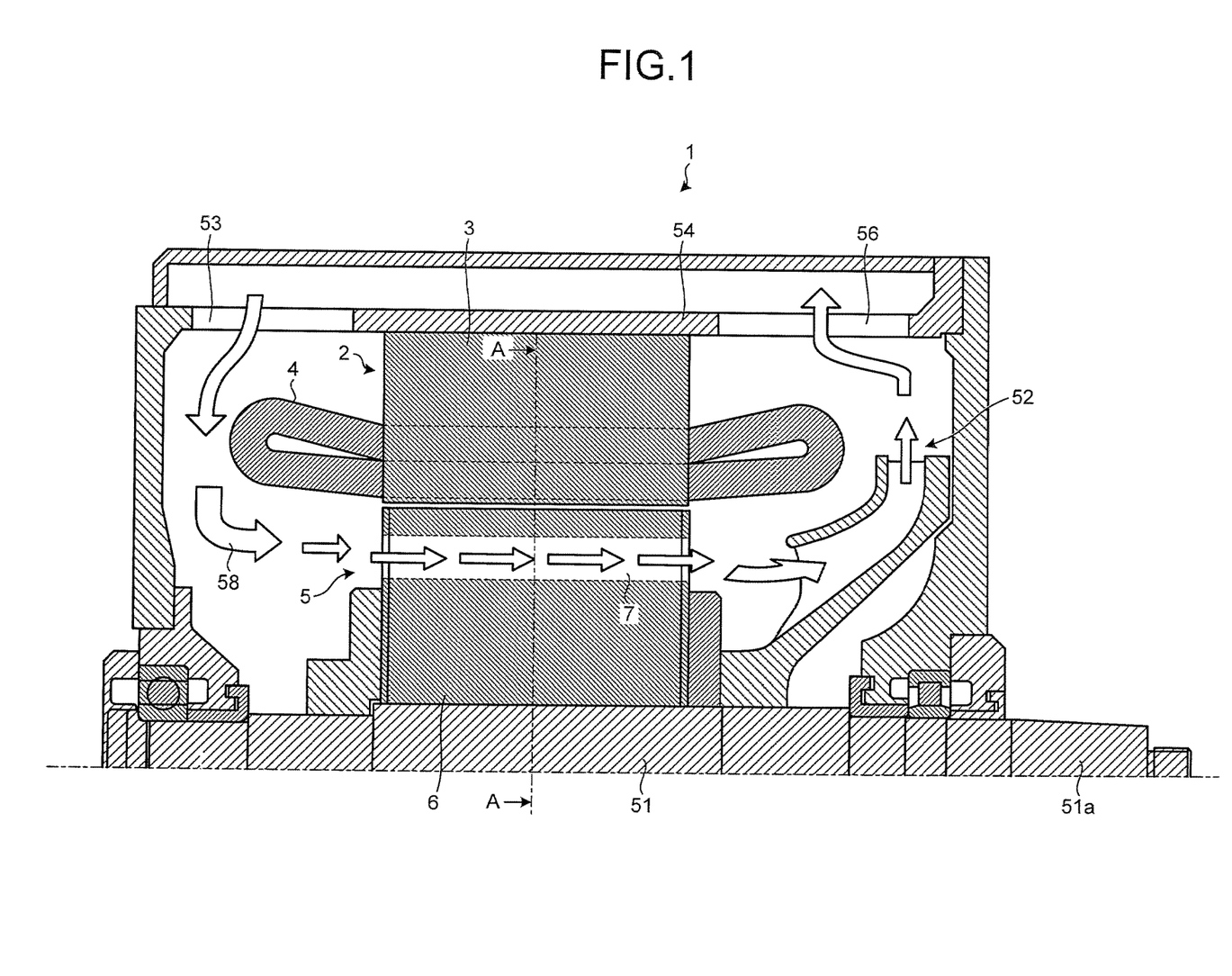
FIG. 1 is an axial cross-sectional view of a permanent magnet-type motor as an example of a permanent magnet-type rotary electric machine according to a first embodiment of the present invention.

FIG. 1 is an axial cross-sectional view of a permanent magnet-type motor 1 as an example of a permanent magnet-type rotary electric machine according to a first embodiment of the present invention. In FIG. 1, for example, in a case of a railroad vehicle, a rotating-shaft drive-side unit 51a is configured to be coupled to an axle (not shown) of the railroad vehicle via a joint (not, shown) and a reduction gear (not shown) to drive wheels (not shown) attached to the axle to run the vehicle.

In a rotor 5 configured to have a rotor core 6 integrated with a rotating shaft 51, a plurality of vent holes 7 passing through the rotor 5 in an axial direction of the rotating shaft 51 are formed. A cooling fan 52 is mounted on the rotating-shaft drive-side unit 51a to cause cooling air 58 taken in through an air inlet 53 to pass through the vent holes 7 and then be discharged through an air outlet 56.

A stator core 3 is arranged to face the rotor core 6 on a device inner side of a frame 54 and a stator winding 4 is attached to the stator core 3. The stator core 3 and the stator winding 4 constitute a stator 2.

Figure 2:
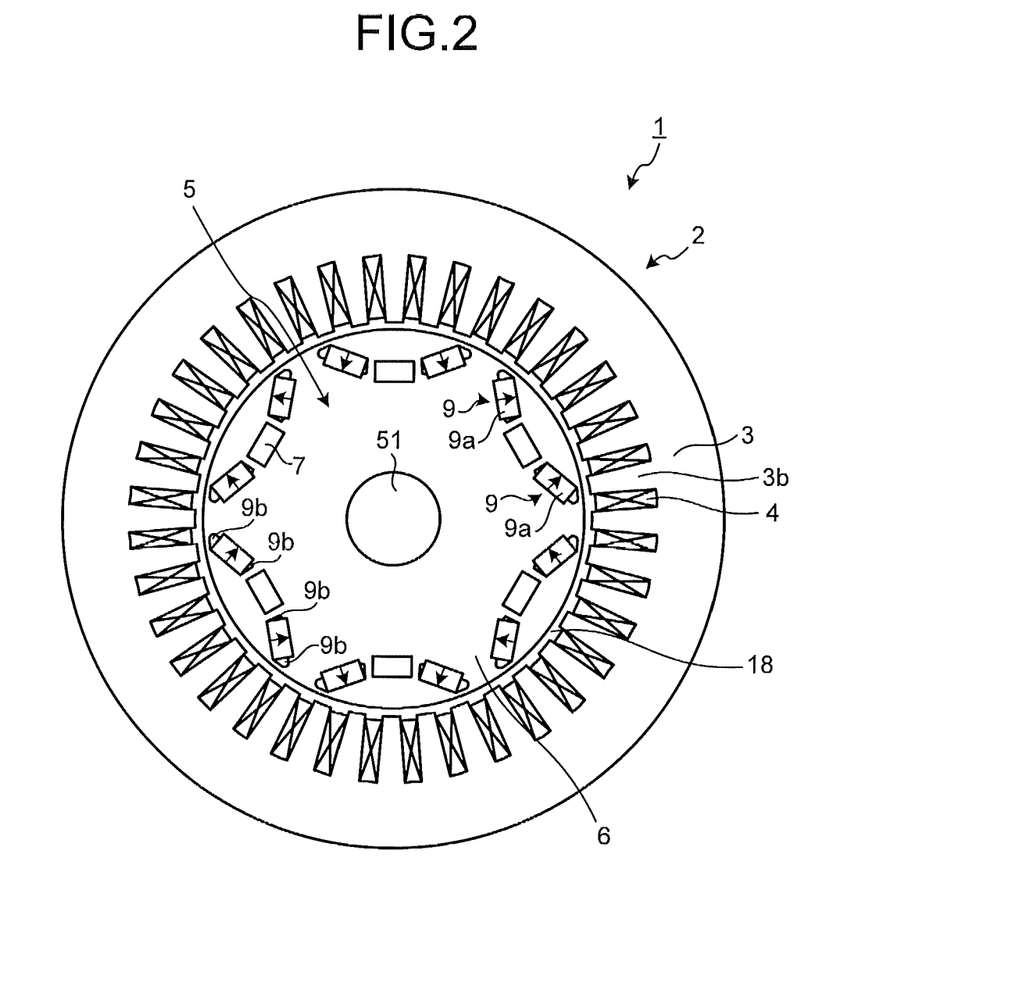
FIG. 2 is a cross-sectional view taken in a direction of arrows A-A in the permanent magnet-type motor shown in FIG. 1.

Configurations of the stator 2 and the rotor 5 are explained next with reference to FIG. 2. FIG. 2 is a cross-sectional view taken in a direction of arrows A-A in the permanent magnet-type motor shown in FIG. 1.

The stator core 3 has a cylindrical shape and forms, on the side of an internal circumferential portion, for example, 36 slots 3a at equal angular pitches and intermittently to form 36 teeth 3b. The stator winding 4 is wound, for example, by distributed winding to encompass a predetermined number of teeth 3b therein and is stored in the slots 3a.

The rotor 5 includes the rotor core 6 that is manufactured, for example, by stacking and integrating a predetermined number of magnetic steel sheets, that has an outer circumferential surface forming a cylindrical surface, and that is formed to array six pairs of two magnet insertion holes 9 and one vent hole 7 (that is, 12 magnet insertion holes 9 and six vent holes 7 in total) at equal angular pitches, and permanent magnets 9a housed in the magnet insertion holes 9, respectively. The rotor 5 is arranged to be capable of rotating with respect to the stator 2 with a rotation gap 18 interposed therebetween. When the permanent magnets 9a are embedded in the magnet insertion holes 9, hollow portions 9b are formed at both side surface portions of each of the permanent magnets 9a, respectively.

Each of the pairs of two magnet insertion holes 9 and one vent hole 7 is arranged (formed) in a substantially U-shape to open toward an outer circumferential surface (in an outer circumferential direction) of the rotor core 6 (in other words, to be convexed toward the rotor center). In each of the pairs, the magnet insertion holes 9 are located at both end portions on the sides of an outer circumference and the vent hole 7 is located at a central portion (on the side of the rotating shaft 51). The permanent magnets 9a are arranged to cause magnetization directions (flux directions) indicated by arrows to be alternately opposite in adjacent ones of the pairs. That is, the rotor 5 in the permanent magnet-type motor 1 according to the first embodiment is configured in such a manner that permanent magnet groups magnetized in directions in which the magnetization directions obtained by the permanent magnets 9a converge toward the outer circumferential surface of the rotor 5 and permanent magnet groups magnetized in directions in which the magnetization directions obtained by the permanent magnets 9a diverge toward the central portion of the rotor 5 are alternately arrayed.

The magnetization directions of the permanent magnet groups are configured as described above in FIG. 2 to cause an induced voltage of a stator coil to be sinusoidal. Therefore, for applications not requiring an induced voltage of a stator coil to be sinusoidal, the magnetization directions are not limited thereto. That is, the magnetization directions of the permanent magnet groups magnetized toward the outer circumferential surface of the rotor 5 or toward the central portion of the rotor 5 can be parallel.

FIG. 2 shows an example of the permanent magnet-type motor that has six pairs of permanent magnet groups each pair including two permanent magnets 9a and one vent hole 7, configured by arranging 36 slots 3a at equal angular pitches in a circumferential direction of the stator 2, embedding 12 permanent magnets 9a constituting the six pairs of permanent magnet groups in the circumferential direction of the rotor core 6, and providing one vent hole 7 between one magnet insertion hole 9 and another magnet insertion hole 9. However, the number of poles, the number of slots, the number of permanent magnets, the number of vent holes, and the like in the motor are not limited to those in the configuration shown in FIG. 1 and arbitrary numbers can be selected.

For example, a permanent magnet having neodymium (Nd), which is one of elements called rare earth, as a primary component is suitable for the permanent magnets 9a to be embedded in the magnet insertion holes 9.

Figure 3:
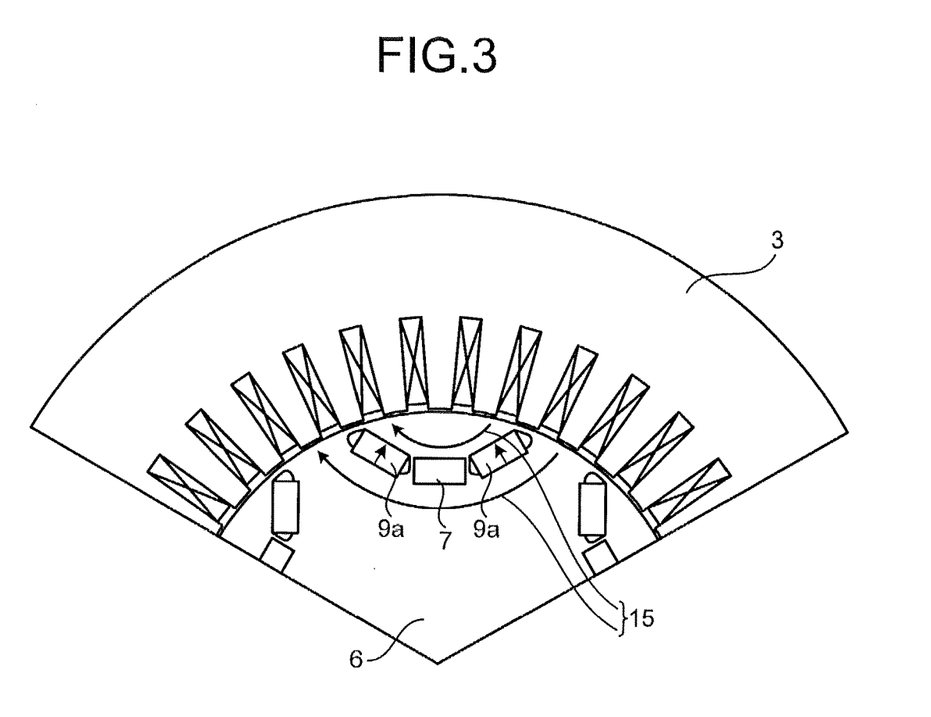
FIG. 3 is a partial cross-sectional view of a magnetic path of reluctance torque shown on the cross-sectional view in FIG. 2.

A torque generation principle in the permanent magnet-type motor is explained next. In the permanent magnet-type motor, there are two kinds of torque including torque (so-called magnet torque) due to an interaction between a magnetic flux produced by permanent magnets and a magnetic flux produced by the stator winding 4 and torque (so-called reluctance torque) due to an interaction between a core portion on a surface of the rotor 5 and a magnetic flux produced by the stator winding 4. Magnetic paths of the reluctance torque in the permanent magnet-type motor according to the first embodiment are shown in FIG. 3. As shown in FIG. 3, magnetic paths 15 of the reluctance torque generate torque in paths along the shape (the U-shape) of two permanent magnets 9a and one vent hole 7 located inside of the rotor core 6.

The vent holes 7 are provided for the purpose of cooling the rotor core 6 and realizes cooling by the cooling fan 52 that is provided on a peripheral portion of the rotor 5 as mentioned above to flow cooling air through the vent holes 7. Therefore, provision of the vent holes 7 at positions that do not block the magnetic paths 15 of the reluctance torque enables an effective use of the reluctance torque. Furthermore, by cooling the rotor core 6, the permanent magnets 9a embedded in the magnet insertion holes 9 can be also cooled.

While a cross-section of the vent holes 7 is formed in a rectangular shape in FIGS. 2 and 3, the shape is not limited thereto. For example, the cross-section can be formed in a circular shape in view of manufacturing facility.

Figure 4:
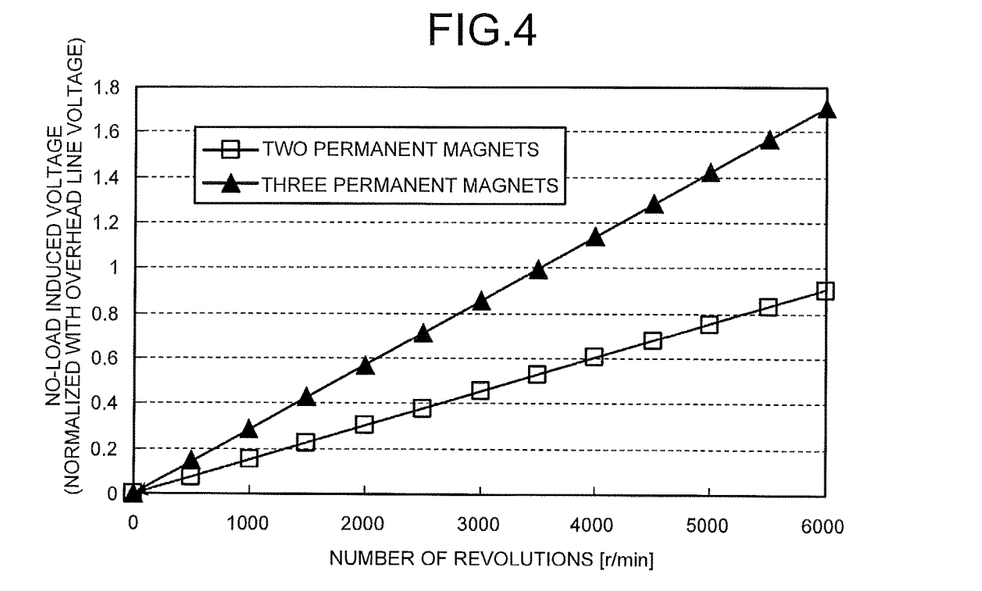
FIG. 4 shows simulation results indicating relations between the number of revolutions of a permanent magnet-type motor and a no-load induced voltage.

An effect of an arrangement configuration of the permanent magnets 9a and the vent holes 7 as shown in FIG. 3 is explained next with reference to FIG. 4. FIG. 4 shows simulation results indicating relations between the number of revolutions of the permanent magnet-type motor and the no-load induced voltage. In FIG. 4, a waveform illustrated with white squares shows simulation values of the no-load induced voltage in a case where the permanent magnets 9a are inserted into two magnet insertion holes 9 located at side surface portions (both end portions on the outer circumferential side) of each of the U-shapes and a waveform illustrated with black triangles shows simulation values of the no-load induced voltage in a case where permanent magnets are inserted also into the positions of the vent holes 7. Numerical values on the vertical axis represent values of the no-load induced voltage normalized with the overhead line voltage. In these simulations, conditions of the stator winding and the like are the same.

FIG. 4 indicates that the no-load induced voltage is equal to or higher than the overhead line voltage in a high-speed rotation area (in a rotation area equal to or higher than 3500 [r/min] in the example of FIG. 4) when three permanent magnets are embedded. When the number of turns in the stator winding 4 is reduced in this case, the no-load induced voltage in the high-speed rotation area can be caused to be close to the overhead line voltage. However, in a vehicle motor, the lower limit of the no-load induced voltage is defined by necessary torque and the current upper limit of switching elements. In the case of a conventional inverter using Si elements (a Si inverter), the current upper limit is small and thus the maximum value of the no-load induced voltage is inevitably equal to or higher than the overhead line voltage.

On the other hand, when a wide band-gap semiconductor element represented by silicon carbide (SiC), gallium nitride (GaN), and the like is used, a loss occurring in the switching elements of an inverter is low and thus a current that can be supplied to the switching elements is more than twice as large as that to be supplied to the Si elements. Accordingly, even when the no-load induced voltage in the high-speed rotation area is lower than the overhead line voltage as in the case where two permanent magnets are embedded (see FIG. 4), necessary torque can be generated by increasing the current supplied to the switching elements.

Therefore, when a wide band-gap semiconductor element such as silicon carbide (SiC) is used as the switching elements of the inverter, the number of permanent magnets 9a containing neodymium (Nd) as a primary component can be reduced to two-thirds of a conventional number of permanent magnets. Accordingly, the cost of the permanent magnet-type motor can be reduced. Furthermore, the magnetic fluxes generated inside of the rotor 5 can be reduced and thus an iron loss being a main factor of the motor loss can be also reduced.

To the permanent magnets used in a vehicle motor, an element material having a higher scarcity value than that of neodymium (Nd), such as dysprosium (Dy) and terbium (Tb), is added as well as neodymium (Nd) to enhance a high-temperature resistance of the magnets. Accordingly, the permanent magnets used in a vehicle motor are quite high in the material cost. On the other hand, when a technique disclosed in the present embodiment, that is, a technique of arranging two permanent magnets only at the side surface portions of each of the U-shapes is adopted, the cooling performance of the rotor 5 can be enhanced. This can lower specifications for the high-temperature resistance of the permanent magnets and thus can further reduce the magnetic cost.

The overhead line voltage varies in a range of ±20% from the center value (1200 volts to 1800 volts in a case of an overhead line of 1500 volts, for example). Accordingly, if the upper limit of the no-load induced voltage is set to a value equal to or lower than 0.8 times the overhead line voltage, the overhead line voltage does not exceed the upper limit of the no-load induced voltage even when the overhead line voltage varies. Thus the motor can be operated up to the maximum number of revolutions thereof without any special control.

When the no-load induced voltage can be set to be equal to or lower than the overhead line voltage, control can be executed only in PWM control on the entire speed area of the vehicle motor. This point is explained with reference to FIG. 5.

Figure 5:
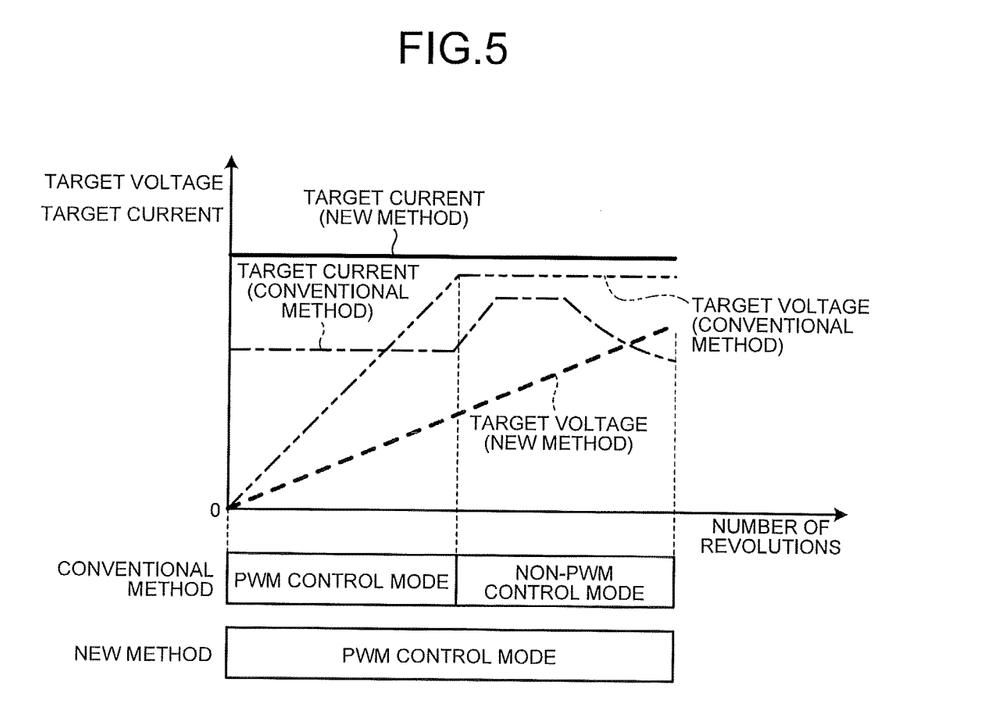
FIG. 5 is an explanatory diagram of a new control method of motor control as compared to a conventional method.

FIG. 5 is an explanatory diagram of a new control method of motor control as compared to a conventional method. In FIG. 5, a waveform illustrated with a thick solid line shows a target current (a target current for a motor, the same applies below) in a case where the new method is used, and a waveform illustrated with a thick broken line shows a target voltage (a target voltage for a motor, the same applies below) in a case where the new method is used. A waveform illustrated with a dotted chain line shows a target current in a case where the conventional method is used and a waveform illustrated with a two-dotted chain line shows a target voltage in a case where the conventional method is used.

As shown in FIG. 5, in motor control by the conventional method, the control is executed in a PWM control mode in which the target current is set constant and the target voltage is proportionally increased according to the number of revolutions until the number of revolutions of the motor becomes a predetermined value while the control is executed in a control mode (a non-PWM control mode) in which the target voltage is controlled to be constant during a multiple pulse mode such as a synchronous pulse mode when the number of revolutions is equal to or larger than a predetermined value. One of the reasons for executing the control in a non-PWM control mode is the problem of the non-load induced voltage as mentioned above.

On the other hand, for example, when a wide band-gap semiconductor element such as silicon carbide (SiC) or gallium nitride (GaN) is used as the switching elements of the inverter, a current more than twice as large as that to the Si elements can be flowed and thus the new method shown in FIG. 5 can be adopted. In the new method, the control is executed in the PWM control mode in which the target current is set constant and the target voltage is proportionally increased according to the number of revolutions in an area up to the maximum number of revolutions of the motor (in the entire control area). While the target voltage is smaller than that of the conventional method, the target voltage is set at larger values than those in the conventional method and therefore desired torque of a value equivalent to (or equivalent to or larger than) a conventional value can be ensured. When the new method is adopted, a regenerative brake can be used, for example, even during high-speed coasting and thus regenerative energy can be effectively used to reduce power consumption. Additionally, use frequency of a mechanical brake can be suppressed to suppress wear of the mechanical brake, so that the life of the mechanical brake can be extended.

Figure 6:
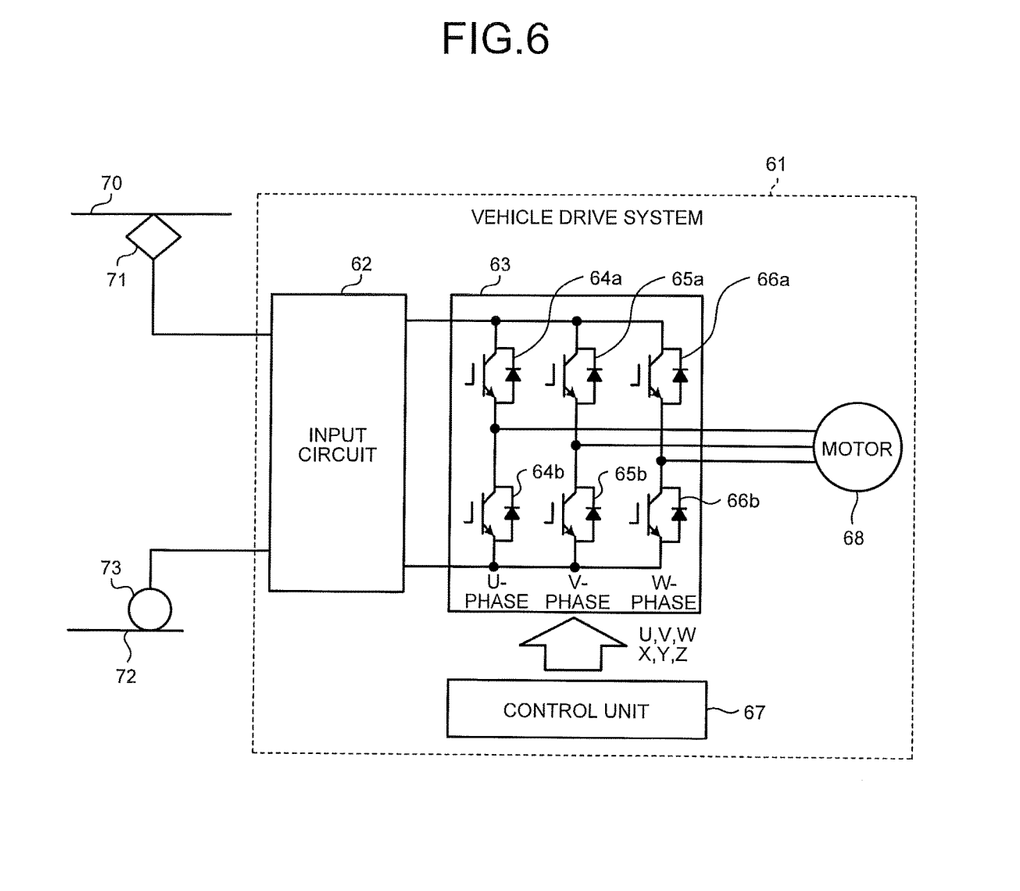
FIG. 6 shows a configuration example of a vehicle drive system that executes the new method according to the present invention.

FIG. 6 shows a configuration example of a vehicle drive system that executes the new method mentioned above. As shown in FIG. 6, a vehicle drive system 61 includes an input circuit 62 including at least a circuit breaker, a filter capacitor, and a filter reactor, an inverter 63 including switching elements 64a, 65a, 66a, 64b, 65b, and 66b and configured to be connected to at least one motor 68 for driving electric vehicles, and a control unit 67 for generating PWM signals U, V, W, X, Y, and Z for executing PWM control on the switching elements 64a, 65a, 66a, 64b, 65b, and 66b included in the inverter 63 and outputting the PWM signals. The permanent magnet-type motor 1 as mentioned above is preferably used as the motor 68 connected to the inverter 63.

In FIG. 6, one end of the input circuit 62 is connected to an overhead line 70 via a current collector 71 and the other end thereof is connected via wheels 73 to a rail 72 being a ground potential. DC power or AC power supplied from the overhead line 70 is input to the one end of the input circuit 62 via the current collector 71 and power (a DC voltage) generated at an output end of the input circuit 62 is input (applied) to the inverter 63. While the overhead line 70 is illustrated as a DC overhead line in FIG. 6, the overhead line 70 can be an AC overhead line. In the case of an AC overhead line, it suffices to provide a transformer at a previous stage of the input circuit 62 in the same configuration except for detailed design parts.

The inverter 63 has legs to which positive arms including the switching elements 64a, 65a, and 66a (the switching element 64a is for a U-phase, for example) and negative arms including the switching elements 64b, 65b, and 66b (the switching element 64b is for the U-phase, for example) are connected in series, respectively. That is, a three-phase bridge circuit having three pairs (corresponding to the U-phase, a V-phase, and a W-phase, respectively) of legs is formed in the inverter 63. In this case, switching elements using a wide band-gap semiconductor (such as SiC or GaN) are used as the switching elements 64a, 65a, 66a, 64b, 65b, and 66b. While FIG. 6 illustrates a configuration example of a case where the number of legs is three (three phases), the number of legs is not limited thereto.

The inverter 63 executes PWM control on the switching elements 64a, 65a, 66a, 64b, 65b, and 66b based on switching signals (the PWM signals) U, V, W, X, Y, and Z output from the control unit 67, thereby converting the DC voltage input from the input circuit 62 into an AC voltage of an arbitrary frequency and an arbitrary voltage to be output. The switching signals U, V, and W are control signals for executing the PWM control of the switching elements 64a, 65a, and 66a (that is, the switching elements of the positive arms), respectively, and the switching signals X, Y, and Z are control signals for executing the PWM control of the switching elements 64b, 65b, and 66b (that is, the switching elements of the negative arms), respectively. Because a configuration of the control unit 67 that executes the PWM control and a configuration of the input circuit 62 that takes in power from the overhead line 70 to supply the power to the inverter 63 are known, detailed explanations thereof are omitted here.

Second Embodiment

Figure 7:
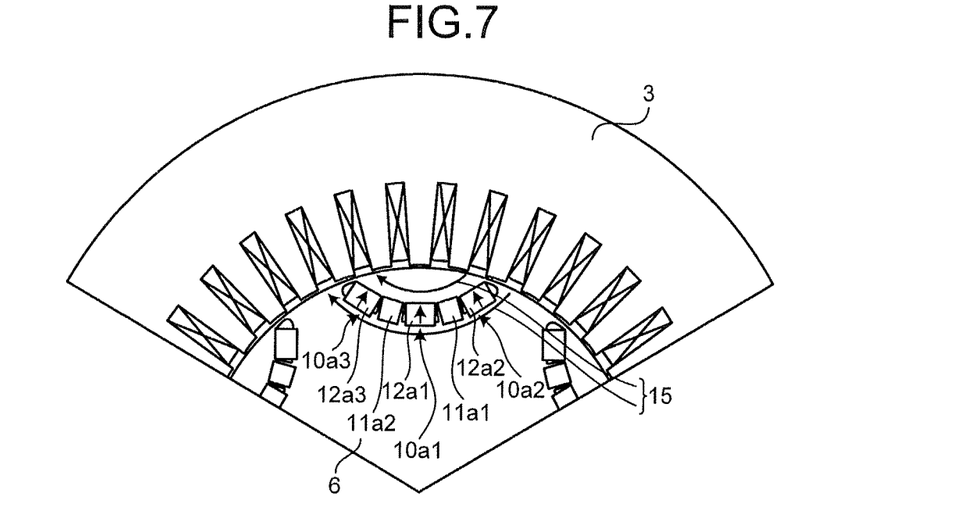
FIG. 7 is a partial cross-sectional view for explaining a rotor configuration according to a second embodiment of the present invention.

FIG. 7 is a partial cross-sectional view for explaining a rotor configuration according to a second embodiment of the present invention. In the second embodiment, as shown in FIG. 7, the rotor has a configuration in which three magnet insertion holes 10a1 to 10a3 and two vent holes 11a1 and 11a2 are provided for each pole and a permanent magnet 12a1 is embedded in the magnet insertion hole 10a1 at a central portion and the permanent magnets 12a2 and 12a3 are embedded in the magnet insertion holes 10a2 and 10a3 at both end portions, respectively. The vent holes 11a1 and 11a2 for cooling the rotor core 6 and the permanent magnets 12a1 to 12a3 are provided between the embedded permanent magnets, specifically, between the permanent magnets 12a1 and 12a2 and between the permanent magnets 12a1 and 12a3, respectively. Similarly to the first embodiment, the size of the magnet insertion holes is larger than that of the permanent magnets to form holes for preventing leakage fluxes at both end portions thereof after the permanent magnets are embedded, thereby to reduce the leakage fluxes.

It is desirable to provide the vent holes 11a1 and 11a2 at positions not to block the magnetic paths 15 of the reluctance torque as explained in the first embodiment. Accordingly, similarly to the first embodiment, the vent holes 11a1 and 11a2 are positioned in a U-shaped curve connecting the permanent magnets 12a1, 12a2, and 12a3. When the vent holes 11a1 and 11a2 are to be specified more quantitatively, it suffices to apply an arrangement as shown in FIG. 8, for example.

Figure 8:
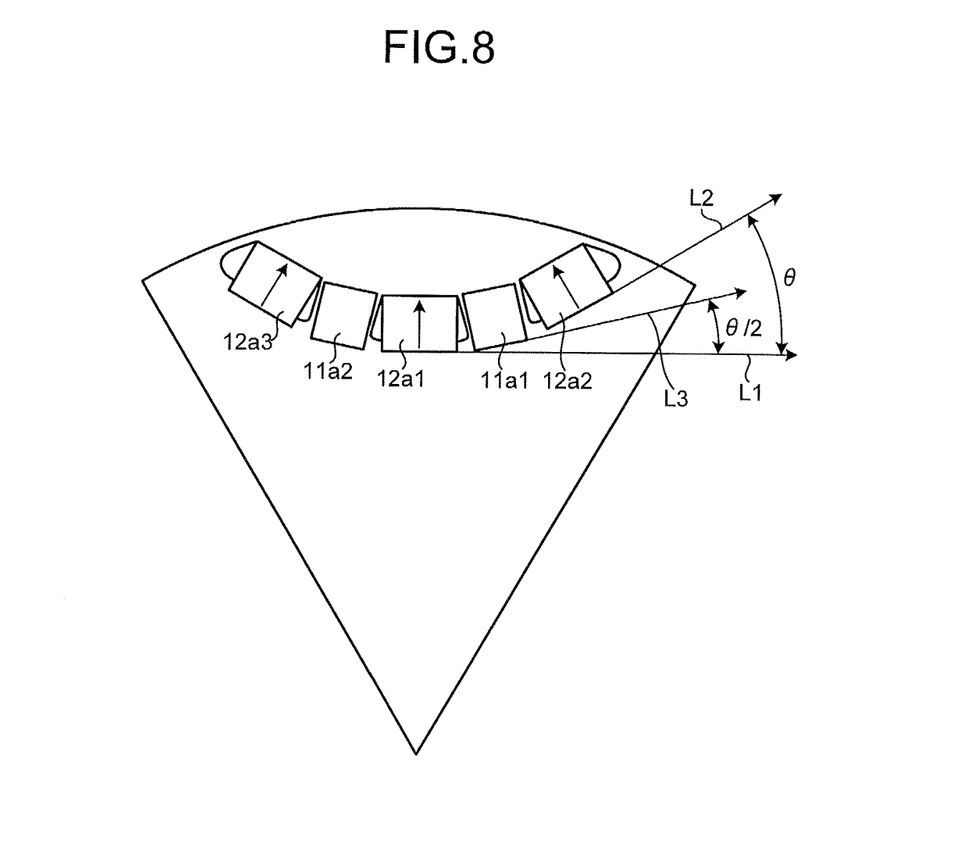
FIG. 8 is an explanatory diagram of arrangement positions of vent holes according to the second embodiment.

In FIG. 8, it is assumed that a direction of an extension of a longitudinal direction of the permanent magnet 12a1 (or the magnet insertion hole 10a1) located at the central portion of the permanent magnet group for one pole is L1, that a direction of an extension of a longitudinal direction of the permanent magnet 12a2 (or the magnet insertion hole 10a2) located on the side of one of the both end portions (the outermost circumferential portions) of the permanent magnet group is L2, and that a direction of an extension of a longitudinal direction of the vent hole 11a1 is L3. At this time, the vent hole 11a1 is arranged to cause an angle formed by the direction L3 and the direction L1 to be substantially half of an angle formed by the direction L2 and the direction L1. The vent hole 11a2 can be similarly positioned based on relations with the permanent magnet 12a1 (or the magnet insertion hole 10a1) and the permanent magnet 12a3 (or the magnet insertion hole 10a3). With this arrangement, the vent holes 11a1 and 11a2 can be provided at positions not blocking the magnetic paths of the reluctance torque and thus the reluctance torque can be effectively used.

Third Embodiment

Figure 9:
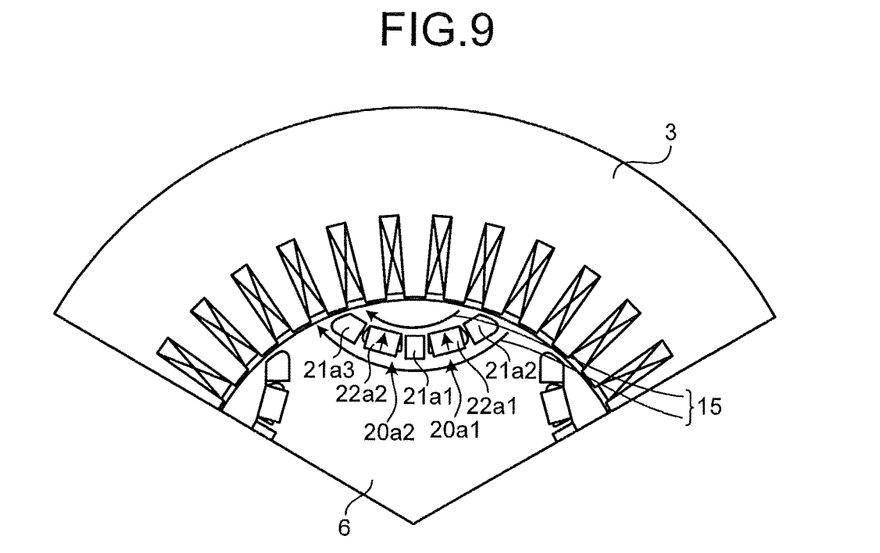
FIG. 9 is a partial cross-sectional view for explaining a rotor configuration according to a third embodiment of the present invention.
Figure 10:
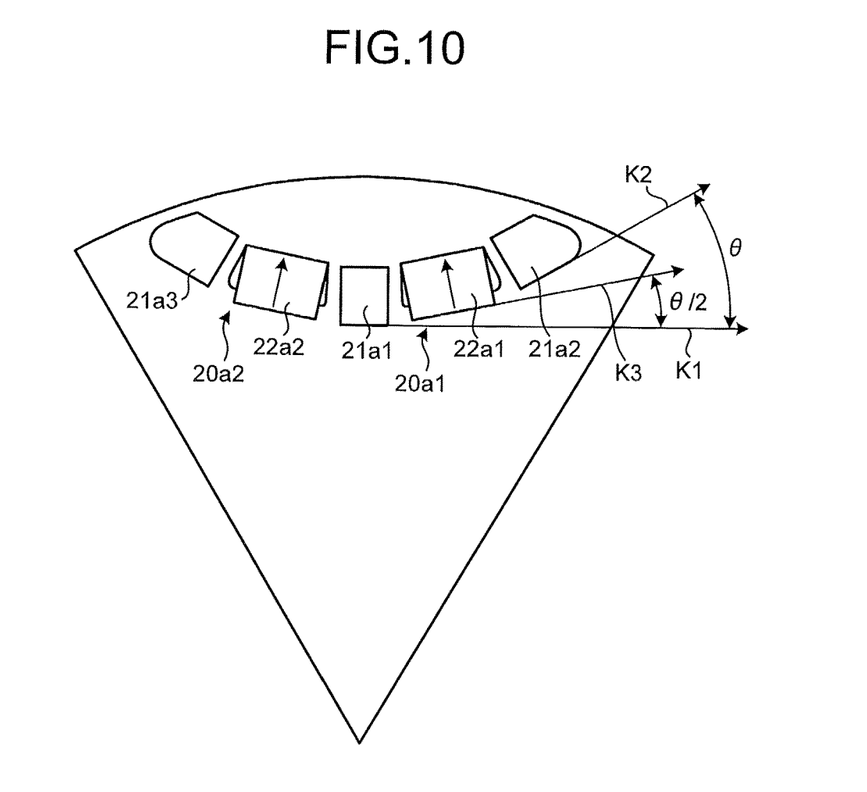
FIG. 10 is an explanatory diagram of arrangement positions of vent holes according to the third embodiment.

FIG. 9 is a partial cross-sectional view for explaining a rotor configuration according to a third embodiment of the present invention. As shown in FIG. 9, the rotor according to the third embodiment has a configuration in which two magnet insertion holes 20a1 and 20a2 and three vent holes 21a1 to 21a3 are provided for each pole, and a permanent magnet 22a1 is embedded in the magnet insertion hole 20a1 located on the right side of the vent hole 21a1 at a central portion and a permanent magnet 22a2 is embedded in the magnet insertion hole 20a2 located on the left side of the vent hole 21a1 at the central portion. The vent holes 21a1 to 21a3 for cooling the rotor core 6 and the permanent magnets 22a1 and 22a2 are provided between the permanent magnet 22a1 and the permanent magnet 22a2, between the permanent magnet 22a1 and an outer circumferential portion of the rotor core 6, and between the permanent magnet 22a2 and an outer circumferential portion of the rotor core 6, respectively. The size of the magnet insertion holes is larger than that of the permanent magnets to form holes for preventing leakage fluxes on both end portions thereof after the permanent magnets are embedded to reduce the leakage fluxes, respectively, similarly to the first and second embodiments.

It is desirable to provide the vent holes 21a1 to 21a3 at positions not blocking the magnetic paths 15 of the reluctance torque as explained in the first and second embodiments. For this purpose, the vent holes 11a1 to 11a3 are positioned in a U-shaped curve connecting the permanent magnets 12a1 and 12a2 and in a curve of an extension of the U-shaped curve toward the outer circumferential portions of the rotor 6 similarly to the first and second embodiments. When the positions of the permanent magnets 12a1 and 12a2 and the vent holes 21a1 to 21a3 are to be specified more quantitatively, it suffices to apply an arrangement as shown in FIG. 9, for example.

In FIG. 9, it is assumed that a direction of an extension of a longitudinal direction of the vent hole 21a1 located at a central portion of a vent hole group including the vent holes 21a1 to 21a3, that is, the vent hole group for one pole is K1, that a direction of an extension of a longitudinal direction of the vent hole 21a2 located on the side of one of both end portions (outermost circumferential portions) of the vent hole group is K2, and that a direction of an extension of a longitudinal direction of the permanent magnet 22a1 is K3. At this time, the magnet insertion hole 20a1 into which the permanent magnet 22a1 is inserted is arranged to cause an angle formed by the direction K3 and the direction K1 to be substantially half of an angle formed by the direction K2 and the direction K1. The permanent magnet 22a2 can be similarly positioned based on relations with the vent hole 21a1 and the vent hole 21a3. With this arrangement, the vent holes 21a1 to 21a3 and the magnet insertion holes 20a1 and 20a2 can be provided at positions not blocking the magnetic paths of the reluctance torque and thus the reluctance torque can be effectively used.

The rotor configurations according to the first to third embodiments are explained above and the following relations are seen between the permanent magnets (the magnet insertion holes) and the vent holes for each pole with reference to the respective drawings for explaining the first to third embodiments.

(1) Either the permanent magnets or the vent holes can be arranged on the outer circumferential portions.

(2) The vent holes are provided on both sides of each of the permanent magnets, respectively, except for those located on the sides of the outer circumferential portions.

(3) The numbers of the permanent magnets and the vent holes can be odd numbers or even numbers.

(4) The number of the vent holes can be more than the number of the permanent magnets, or vice versa.

(5) The sum of the number of the permanent magnets and the number of the vent holes is an odd number.

The relation (5) is an essential point in the invention of the present application and is not a characteristic for convenience sake. For example, when the vent hole 7 located at the central portion in FIG. 3 is divided into two, the sum of the number of the permanent magnets and the number of the vent holes becomes an even number. However, such a way of counting is not essential. In view of the function of the vent hole 7, the number of the vent holes 7 is one. This point holds true for the permanent magnets.

As described above, the permanent magnet-type rotary electric machines according to the first to third embodiments have a configuration in which a plurality of magnet insertion holes in which permanent magnets are embedded, respectively, are arranged in the rotor core in substantially U-shapes facing the outer circumferential surface of the rotor, and the vent holes are arranged in a permanent magnet group for each pole at positions to pass through the rotor core in the axial direction thereof between one of the magnet insertion holes in which the permanent magnets are embedded and adjacent one of the magnet insertion holes or between the one of the magnet insertion holes and outer circumferential portions of the rotor core and to form the substantially U-shape together with the magnet insertion holes. Such a configuration constitutes a considerable factor of driving the permanent magnet-type rotary electric machine with an inverter including the switching elements having a wide band-gap semiconductor as a base.

That is, because the wide band-gap semiconductor is used for the inverter, the permanent magnet-type rotary electric machine can be driven by the new method mentioned above. As a result, the quantity of the permanent magnets can be reduced and thus the vent holes for cooling can be provided in spaces produced by the reduction. Furthermore, the above configuration enables the vent holes for cooling to be provided without blocking the magnetic paths of the reluctance torque. Accordingly, while the quantity of the permanent magnets is reduced, reduction in the reluctance torque can be suppressed.

Because the vent holes for cooling can be provided in the spaces produced by reducing the quantity of the permanent magnets in the permanent magnet-type rotary electric machines according to the first to third embodiments, the performance of cooling the permanent magnets can be enhanced. As a result, reduction in the cooling performance of the rotor and therefore in the performance of the rotary electric machine can be suppressed, which can contribute to a further enhancement in the overall efficiency including the driving circuits such as the inverter.

With the permanent magnet-type rotary electric machines according to the first to third embodiments, the specifications for the high-temperature resistance of the permanent magnets can be lowered as compared to the conventional one because of the enhancement in the cooling performance of the rotor. Therefore, the cost of the permanent magnets can be reduced.

Furthermore, with the permanent magnet-type rotary electric machines according to the first to third embodiments, the vent holes are arranged at positions to form a substantially U-shape together with the magnet insertion holes. Such arrangement positions of the vent holes neither block the magnetic paths of the reluctance torque nor block the magnetic paths of the magnet torque. For example, when the position of the vent hole 7 is on the outer circumferential side of the rotor core 6 in FIG. 3, the magnetic paths from the permanent magnets 9a and 9a to the stator core 3 is blocked. In contrast, the vent holes 7 are provided at positions on sides nearer to the center axis than the outer circumferential portions of the rotor core 6 in the configurations according to the first to third embodiments and thus reduction of the magnet torque can be also suppressed.

INDUSTRIAL APPLICABILITY

As described above, the present invention is useful as a permanent magnet-type rotary electric machine that can suppress reduction of reluctance torque while reducing the quantity of permanent magnets.

REFERENCE SIGNS LIST

1 permanent magnet-type motor
2 stator
3 stator core
3a slot
3b teeth
4 stator winding
5 rotor
6 rotor core
7, 11a1, 11a2 vent hole
9, 10a1, 10a2, 10a3 magnet insertion hole
9a, 12a1, 12a2, 12a3 permanent magnet
9b hollow portion
15 magnetic path
18 rotation gap
51 rotating shaft
51a rotating-shaft drive-side unit
52 cooling fan
53 air inlet
54 frame
56 air outlet
58 cooling air

The invention claimed is:
1. A railroad-vehicle drive system comprising:
a permanent magnet-type motor;
an inverter that includes switching elements formed of a wide band-gap semiconductor and that drives the permanent magnet-type motor; and
a control unit that controls the inverter,
wherein the permanent magnet-type motor includes a rotor core in which magnet insertion holes are arranged in a convex shape, facing a center of a rotor, the magnet insertion holes having a plurality of permanent magnets embedded therein for each pole,
wherein a permanent magnet group for each pole having the plurality of permanent magnets includes vent holes passing through the rotor core in an axial direction between one of the magnet insertion holes in which the permanent magnets are embedded and adjacent one of the magnet insertion holes or between the one of the magnet insertion holes and outer circumferential portions of the rotor core,
wherein the control unit controls the inverter with a target current constant, in an entire control area up to a maximum number of revolutions of the permanent magnet-type motor, and
wherein the magnet insertion holes and the vent holes are alternately arranged in a substantially U-shape to be convexed toward a center of the rotor.

2. The railroad-vehicle drive system according to claim 1, wherein the control unit controls the inverter so that a no-load induced voltage at the maximum number of revolutions of the permanent magnet-type motor is smaller than a central value of an overhead line voltage, only in a PWM control mode that proportionally increases a target voltage according to a number of revolutions.

3. The railroad-vehicle drive system according to claim 1, wherein the magnet insertion holes and the vent holes are arranged not to block magnetic paths of reluctance torque.

4. The railroad-vehicle drive system according to claim 3, wherein the vent holes are provided in the rotor core on both sides of each of the permanent magnets, except for the permanent magnets located on sides of outer circumferential portions.

5. The railroad-vehicle drive system according to claim 3, wherein a sum of the number of the permanent magnets and the number of the vent holes for each pole is an odd number.

6. The railroad-vehicle drive system according to claim 3, wherein the number of the permanent magnets for each pole is an odd number equal to or larger than three, and the permanent magnets are arranged at a central portion of the permanent magnet group and outermost circumferential portions of the permanent magnet group.

7. A railroad-vehicle drive system comprising,
a permanent magnet-type motor;
an inverter that includes switching elements formed of a wide band-gap semiconductor and that drives the permanent magnet-type motor; and
a control unit that controls the inverter,
wherein the permanent magnet-type motor includes a rotor core in which magnet insertion holes are arranged in a convex shape, facing a center of a rotor, the magnet insertion holes having a plurality of permanent magnets embedded therein for each pole,
wherein a permanent magnet group for each pole having the plurality of permanent magnets includes vent holes passing through the rotor core in an axial direction between one of the magnet insertion holes in which the permanent magnets are embedded and adjacent one of the magnet insertion holes or between the one of the magnet insertion holes and outer circumferential portions of the rotor core,
wherein the control unit controls the inverter with a target current constant, in an entire control area up to a maximum number of revolutions of the permanent magnet-type motor,
wherein the magnet insertion holes and the vent holes are arranged in a substantially U-shape, facing an outer circumferential surface of the rotor not to block magnetic paths of reluctance torque,
wherein the number of the permanent magnets for each pole is an odd number equal to or larger than three, and the permanent magnets are arranged at a central portion of the permanent magnet group and outermost circumferential portions of the permanent magnet group, and wherein the number of the permanent magnets for each pole is three, and, when assuming that a tangential direction of the U-shape at a first permanent magnet located at the central portion of the permanent magnet group or at a first magnet insertion hole in which the first permanent magnet is embedded is a first direction, that a tangential direction of the U-shape at a second permanent magnet located on a side of one of both end portions of the permanent magnet group or at a second magnet insertion hole in which the second permanent magnet is embedded is a second direction, and that a tangential direction of the U-shape at a vent hole provided between the first magnet insertion hole and the second magnet insertion hole is a third direction, the vent hole is arranged so that an angle formed by the third direction and the first direction is substantially half an angle formed by the second direction and the first direction.

8. The railroad-vehicle drive system according to claim 3, wherein the number of the permanent magnets for each pole is an even number equal to or larger than two, and, in a vent hole group for each pole including a plurality of the vent holes, the vent holes are arranged at a central portion and outermost circumferential portions of the vent hole group.

9. A railroad-vehicle drive system comprising,
a permanent magnet-type motor;
an inverter that includes switching elements formed of a wide band-gap semiconductor and that drives the permanent magnet-type motor; and
a control unit that controls the inverter,
wherein the permanent magnet-type motor includes a rotor core in which magnet insertion holes are arranged in a convex shape, facing a center of a rotor, the magnet insertion holes having a plurality of permanent magnets embedded therein for each pole,
wherein a permanent magnet group for each pole having the plurality of permanent magnets includes vent holes passing through the rotor core in an axial direction between one of the magnet insertion holes in which the permanent magnets are embedded and adjacent one of the magnet insertion holes or between the one of the magnet insertion holes and outer circumferential portions of the rotor core,
wherein the control unit controls the inverter with a target current constant, in an entire control area up to a maximum number of revolutions of the permanent magnet-type motor,
wherein the magnet insertion holes and the vent holes are arranged in a substantially U-shape, facing an outer circumferential surface of the rotor not to block magnetic paths of reluctance torque,
wherein the number of the permanent magnets for each pole is an even number equal to or larger than two, and, in a vent hole croup for each pole including a plurality of the vent holes, the vent holes are arranged at a central portion and outermost circumferential portions of the vent hole group, and
wherein the number of the vent holes for each pole is three, and, when assuming that a tangential direction of the U-shape at a first vent hole located at a central portion is a first direction, that a tangential direction of the U-shape at a second vent hole located on a side of one of outer circumferential portions of the rotor core is a second direction, and that a tangential direction of the U-shape at a permanent magnet located between the first vent hole and the second vent hole or at a magnet insertion hole in which the permanent magnet is embedded is a third direction, the permanent magnet is arranged so that an angle formed by the third direction and the first direction is substantially half an angle formed by the second direction and the first direction.

10. The railroad-vehicle drive system according to claim 2, wherein the no-load induced voltage at the maximum number of revolutions is equal to or lower than 0.8 times a central value of an overhead line voltage.

* * * * *